(12) United States Patent
Foster et al.

(10) Patent No.: US 11,008,498 B2
(45) Date of Patent: May 18, 2021

(54) CEMENT SLURRY RESPONSIVE TO HYDROCARBON GAS

(71) Applicant: Saudi Arabian Oil Company, Dhahran (SA)

(72) Inventors: Herschel Foster, Dhahran (SA); Mahmoud Alqurashi, Dhahran (SA); Shrikant Tiwari, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 152 days.

(21) Appl. No.: 16/104,084

(22) Filed: Aug. 16, 2018

(65) Prior Publication Data

US 2020/0056084 A1   Feb. 20, 2020

(51) Int. Cl.
*C09K 8/493* (2006.01)

(52) U.S. Cl.
CPC .......... *C09K 8/493* (2013.01); *C09K 2208/10* (2013.01)

(58) Field of Classification Search
CPC ... C04B 20/1066; C04B 20/107; C04B 28/02; C04B 20/008; C04B 22/068; C04B 28/04; C04B 14/041; C04B 14/06; C04B 2103/0025; C04B 22/10; C04B 2111/0081; C09K 2208/10; C09K 8/493
See application file for complete search history.

(56) References Cited

U.S. PATENT DOCUMENTS

| 4,304,298 | A | 12/1981 | Sutton |
| 4,450,010 | A | 5/1984 | Burkhalter et al. |
| 5,613,558 | A | 3/1997 | Dillenbeck, III |
| 7,105,587 | B2 | 9/2006 | Tagge et al. |
| 2003/0221831 | A1 | 12/2003 | Reddy et al. |
| 2006/0142512 | A1 | 6/2006 | Pojman et al. |
| 2007/0021309 | A1 | 1/2007 | Bicerano |
| 2011/0048713 | A1 | 3/2011 | Lewis et al. |
| 2011/0048715 | A1 | 3/2011 | Lewis et al. |
| 2011/0079389 | A1 | 4/2011 | Mackay et al. |
| 2013/0261220 | A1 | 10/2013 | Murphy |
| 2014/0305646 | A1 | 10/2014 | Chew et al. |

(Continued)

FOREIGN PATENT DOCUMENTS

| FR | 2986790 A1 | 8/2013 |
| WO | 2007134349 A1 | 11/2007 |
| WO | 2015180992 | 12/2015 |

OTHER PUBLICATIONS

McVicker, R. U. Selective Low Temperature Oxidation of Methane with Hydrogen Peroxide by Quasi-Heterogeneous Catalysis (Published master's thesis). University of Cardiff. 2014.

(Continued)

*Primary Examiner* — Shuangyi Abu Ali
(74) *Attorney, Agent, or Firm* — Bracewell LLP; Constance G. Rhebergen; Kevin R. Tamm

(57) ABSTRACT

A method for reducing gas seepage into a cement slurry. The method includes adding a formulation to the cement slurry, the formulation comprising at least one component responsive to a predetermined concentration of hydrocarbon gas in the cement slurry, where upon the cement slurry reaching the predetermined concentration of hydrocarbon gas, the hydrocarbon gas undergoes at least a partial oxidation caused by the formulation to quicken the setting time of the cement slurry via release of heat by an exothermic reaction.

11 Claims, 2 Drawing Sheets

(56) References Cited

U.S. PATENT DOCUMENTS

2016/0194548 A1    7/2016  Xie et al.
2017/0066959 A1*  3/2017  Hull ...................... C09K 8/805

OTHER PUBLICATIONS

Ab Rahim, M. H., et al "Oxidation of Methane to Methanol with Hydrogen Peroxide Using Supported Gold-Palladium Alloy Nanoparticles." Angewandte Chemie, (2012), 52, 1280-1284.
Han, B., et al. "A review of the direct oxidation of methane to methanol." Chinese Journal of Catalysis, 2016, 37(8), 1206-1215.
Hanotier, J., et al "Low-temperature oxidation of n-alkanes by cobaltic acetate activated by strong acids." Journal of the Chemical Society, Perkin Transactions 2, 1972, Issue 15, 2247.
Klerk, A. D. "Engineering evaluation of direct methane to methanol conversion." Energy Science & Engineering, 2014, 3(1), 60-70.
Seki, Y., et al, "Reaction Mechanism of Oxidation of Methane with Hydrogen Peroxide Catalyzed by 11-Molybdo-1-vanadophosphoric Acid Catalyst Precursor." The Journal of Physical Chemistry B, 2000, 104, 5940-5944.
International Search Report and Written Opinion for related PCT application PCT/US2019/046654 dated Dec. 3, 2019.

* cited by examiner

CEMENT SLURRY RESPONSIVE TO HYDROCARBON GAS

BACKGROUND

Field

Embodiments of the disclosure relate to cement slurries responsive to hydrocarbon gas concentrations. In particular, embodiments of the disclosure show cement slurry compositions with quickened setting times in response to exposure to certain levels of hydrocarbon gas, for example methane in a hydrocarbon-bearing reservoir.

Description of the Related Art

Cementing is applied in oil and gas drilling to stabilize wells and can be used, for example, with casings. Well design typically includes several casing strings. A predetermined size of hole is drilled to a casing point, and casing is run to avoid collapse of the drilled formation. Casing strings are cemented in place to ensure proper isolation from deeper formations to be drilled, and further to fulfil well objectives.

During oil and gas well cementing operations, there may be an influx of gas into wet cement slurry once disposed in a wellbore. This occurs during cement slurry transitions, as the cement slurry loses its hydrostatic weight and prior to thickening. Keeping the transition time between the slurry phase and hardened cement as short as possible is important to minimize gas influx and gas migration up the hole through channels. In the oil and gas industry, this is sometimes referred to as right angle set.

In shallow wells, proper cement setting profiles are difficult to produce due to lower temperatures of the shallow wells (longer set times) and lesser amount and weight of slurry required. Also in some areas, there is significant shallow gas accumulation, which makes effective cementing extremely difficult. Once gas enters the annulus surrounding the wellbore with setting cement, the gas will rise to the surface creating a path or channel as it progresses through the setting cement, which is undesirable. Certain gas intrusion and gas channel formation mitigation methods and compositions exist and are used in the oil and gas industry, but rely on expanding agents (inert gas generating agents) or latex compounds in order to prevent the formation of gas channels. Existing mitigation compositions and methods can negatively impact wellbore cementing operations and lack effectiveness.

Poor cementation can significantly impact subsequent well performance and return on investment. In comparison to the initial expenditure, a poor cement job can result in very high remedial costs. For example, failure to achieve good zonal isolation in primary cementing costs millions of dollars each year in well repairs and lost production.

SUMMARY

Applicant has recognized that there is a need for responsive cement slurry compositions, methods, and systems for enhancing cement setting ability in the presence of external damaging components, for example natural gas comprising methane. In some embodiments, compositions of the present disclosure are responsive to or react to a certain level of gas intrusion into a cement slurry and react only at or above a certain level of gas intrusion. Gas channel mitigation is effected once the cement slurry is in place and setting, for example in a wellbore proximate well casing.

In the event of hydrocarbon gas intrusion, for example methane or ethane, in concentrations above a predetermined threshold coming in contact with a cement slurry in static condition, compositions of the present disclosure will effect an exothermic reaction. The compositions can be incorporated into the cement slurry without lessening the final set strength of the cement.

Exothermic reactions of the present disclosure accelerate cement slurry transition profiles from slurry to solid, reducing the time required between hydrostatic head loss and cement setting thereby preventing more gas, for example methane, from entering the wellbore, penetrating the cement matrix, or migrating further up the wellbore toward the surface. Embodiments of the present disclosure reduce or eliminate problems related to channeling in cement matrices, which can include a breach of the annular barrier generally resulting in migration of fluid influx past the cement barrier causing casing to casing annulus (CCA) pressures throughout the life of the well.

Embodiments of the disclosure add one or more reagent to well cement slurry, which is responsive to the presence of free hydrocarbon gas and acts as an initiator and/or catalyst to carry out an exothermic reaction. For example, once a required volume of cement slurry is pumped into a wellbore and is in static condition, in an annulus for example, methane gas concentration above a certain threshold proximate and/or within the cement slurry will activate the one or more reagent to start an exothermic reaction. This exothermic reaction generates heat, which will change the setting profile of the slurry and greatly reduce the transition time between the slurry and solid states. Embodiments of the present disclosure allow cement setting at a right angle profile, thereby trapping hydrocarbon gas before it has a chance to complete its migration to the surface forming vertical flow channels within the cement.

Certain compositions and methods of the present disclosure do not depend or rely on formation temperature, as example reactions can depend on gas concentration only, thereby allowing gas channel mitigation techniques described here to be used in wells at a variety of temperatures.

Example embodiments of compositions, methods, and systems described herein utilize exothermic chemical reactions based on the controlled oxidation of naturally occurring hydrocarbon gases, for example methane, in the formation to methanol, carbon dioxide, water, and heat. Suitable exothermic reactions can occur when methane reacts with an oxidative agent, such as for example hydrogen peroxide in addition to or alternative to a similar oxidant. Such oxidants can be pre-mixed into suitable reactive compositions and into the cement slurry, or can be generated in situ.

Therefore, disclosed herein is a method for reducing gas seepage into a cement slurry, the method comprising the steps of adding a formulation to the cement slurry, the formulation comprising at least one component responsive to a predetermined concentration of hydrocarbon gas in the cement slurry, where upon the cement slurry reaching the predetermined concentration of hydrocarbon gas, the hydrocarbon gas undergoes at least a partial oxidation caused by the formulation to quicken the setting time of the cement slurry via release of heat by an exothermic reaction. In some embodiments of the method, the formulation includes an oxidant and a catalyst. In other embodiments of the method, the oxidant comprises hydrogen peroxide. Still in other embodiments, the catalyst is selected from the group consisting of: a metal-containing heterogeneous catalyst; a metal-containing homogeneous catalyst; and combinations thereof.

In certain embodiments, the formulation further comprises a strong acid. In yet other embodiments, the method includes the step of injecting the cement slurry into an annulus proximate a wellbore. In some embodiments, the method includes the step of adding the formulation to the annulus via a spacer fluid before injecting the cement slurry. Still in other embodiments, the step of adding the formulation is performed after the step of injecting the cement slurry. In certain embodiments, the step of adding the formulation is performed during the step of injecting the cement slurry. Some embodiments of the method include the step of generating hydrogen peroxide in situ proximate the wellbore. In other embodiments, the formulation comprises between about 1% by weight and about 6% by weight of the cement slurry.

Additionally disclosed is a composition for reducing gas seepage into a cement slurry, the composition including at least one component responsive to a predetermined concentration of hydrocarbon gas in the cement slurry, where upon the cement slurry reaching the predetermined concentration of hydrocarbon gas, the hydrocarbon gas undergoes at least a partial oxidation caused by the composition to quicken the setting time of the cement slurry via release of heat by an exothermic reaction. In some embodiments, the composition includes an oxidant and a catalyst. In other embodiments, the oxidant comprises hydrogen peroxide. Still in other embodiments, the catalyst is selected from the group consisting of: a metal-containing heterogeneous catalyst; a metal-containing homogeneous catalyst; and combinations thereof.

In certain embodiments, the metal comprises a metal selected from the group consisting of: gold; palladium; platinum; copper; iron; molybdenum; tin; rhodium; ruthenium; and combinations of the same. In yet still other embodiments of the composition, the composition further comprises a strong acid. In certain embodiments, the heterogeneous catalyst includes supported nanoparticles. In some embodiments, at least one component is encapsulated. And still in other embodiments, the at least one component comprises between about 1% by weight and about 6% by weight of the cement slurry.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
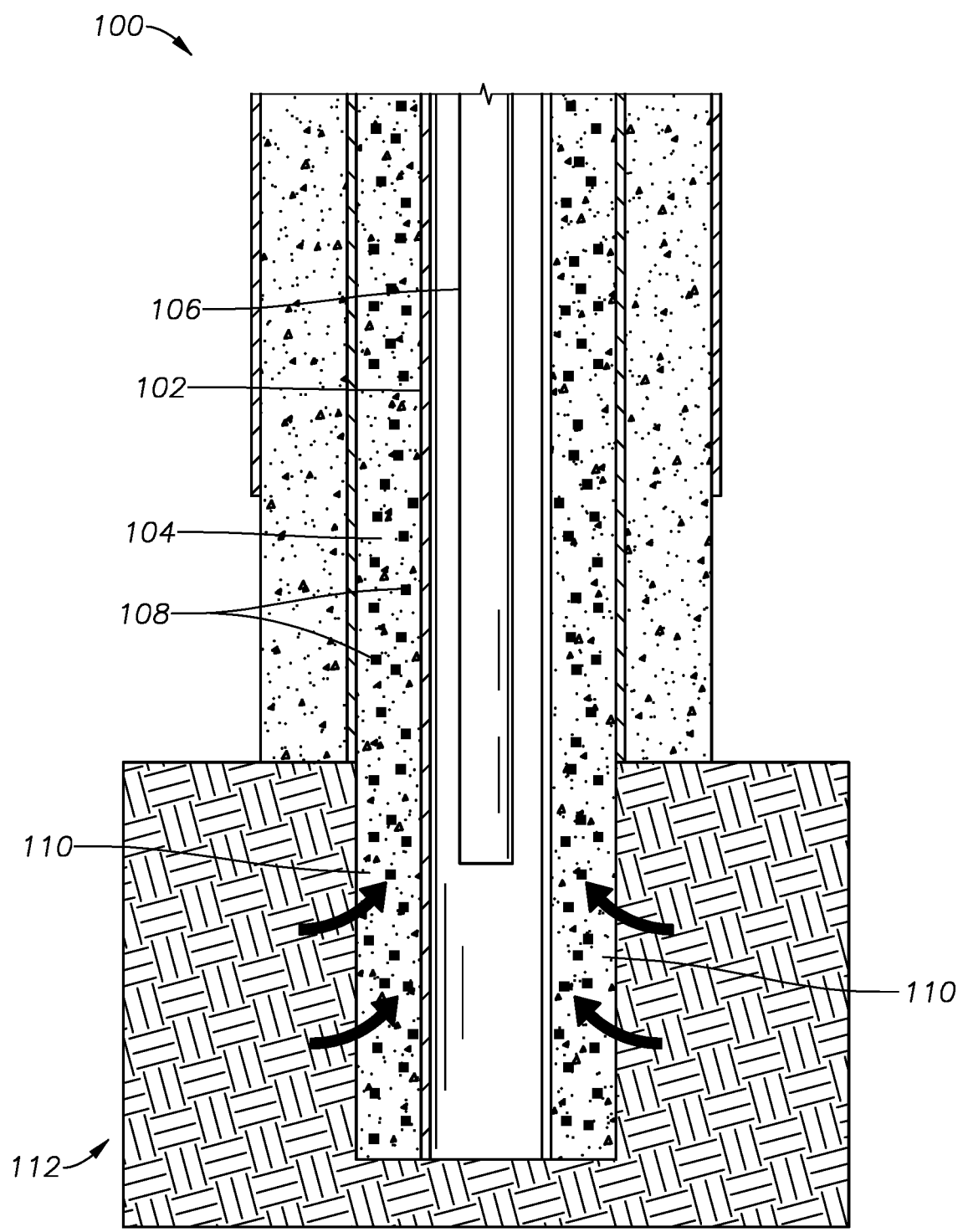
FIG. 1 is a cross-sectional diagram of a wellbore showing a responsive cement slurry of the present disclosure disposed around a casing before setting.

So that the manner in which the features and advantages of the embodiments of cement slurry compositions, methods, and systems for enhancing cement setting ability in the presence of external damaging components, for example natural gas comprising methane, as well as others, which will become apparent, may be understood in more detail, a more particular description of the embodiments of the present disclosure briefly summarized previously may be had by reference to the various embodiments, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

In embodiments of the disclosure, added to a wellbore cement slurry is a composition including one or more reagent in addition to or alternative to one or more catalyst, which allows an exothermic reaction to take place once methane in addition to or alternative to other hydrocarbon gas crosses a certain concentration threshold as it enters the slurry in situ. The composition can include one or more homogeneous or heterogeneous catalyst. For example, a suitable exothermic reaction mechanism includes the selective oxidation of hydrocarbons with hydrogen peroxide in the presence of at least one low temperature catalyst.

In industry today, certain catalytic oxidations are used for the conversion of petroleum-derived hydrocarbons to commodities, and catalytic oxidations are also used in the manufacture of fine chemicals. An example chemical equation for one intended exothermic chemical reaction is provided below in Equation 1. In other embodiments, other reactants, products, and more than one catalyst may exist for a given exothermic reaction.

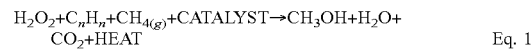

$$H_2O_2 + C_nH_n + CH_{4(g)} + CATALYST \rightarrow CH_3OH + H_2O + CO_2 + HEAT \qquad \text{Eq. 1}$$

Methane, a large constituent of formation gas which can enter a given wellbore, is a small and hard molecule, which is generally difficult to react. A suitable catalyst in the cement slurry acts in similar manner to a catalytic converter in an automobile exhaust system. For example, materials used in the slurry may be palladium-based catalysts, which have been found to be efficient catalysts for the catalytic oxidation of methane to carbon dioxide and water. Certain catalysts which provide substantially complete $CH_4$ oxidation at low temperatures are usually based on noble metals (for example Pd, Pt, Rh, Ru). These metals do not react with the cement slurry itself, and are inert in the slurry's presence, including with $H_2O_2$, until the metal comes into contact with a pre-determined or pre-selected methane concentration at formation temperature.

Another catalytic formulation can include a platinized tin oxide (Pt/SnOx), which can be used in addition to or alternative to silica and cordierite catalyst supports. Originally developed for removal of CO, this catalyst has also proven effective for removal of lightweight hydrocarbons, such as methane.

Methane and higher molecular weight hydrocarbon concentrations may be great or small, depending on the formation, wellbore, and cement type. In the case of lesser concentrations of methane in cement slurry, for example less than about 1% by weight methane, less than about 5% by weight methane, less than about 10% by weight methane or less than about 20% by weight methane, in some embodiments there will be no significant impact on the quality of the cement job. The amount of catalyst and any additional oxidizing component, such as for example $H_2O_2$, is pre-determined or pre-selected to react at a threshold amount of methane concentration.

In the case of greater concentrations of methane which might damage the integrity of the cement during setting in certain wellbore design instances, for example in some embodiments greater than about 1% by weight methane, greater than about 5% by weight methane, greater than about 10% by weight methane, or greater than about 20% by weight methane, the catalytic reaction would produce proportionally more heat hence reducing the transition time of the slurry. In some embodiments, cement additives other than the catalyst(s) can comprise between about 0.5% by weight and about 10% by weight or between about 1% by weight and about 5% by weight or between about 1% by weight and about 3% by weight of the cement slurry. In some embodiments, the catalyst(s) can comprise between about 0.5% by weight and about 10% by weight or between about 1% by weight and about 5% by weight or between about 1% by weight and about 3% by weight of the cement slurry.

In the reaction with the hydrocarbon gas, one or more catalyst speeds up the removal of the methane according to Equation 1 supra. Once again, suitable catalysts include those comprising platinum or a similar element, which could be a platinum-like metal such as palladium or rhodium. Also, an effective catalyst for the oxidation of methane and higher hydrocarbons is $Cr_2O_2$. These compounds and element candidates for catalysts can be similar to those used in industrial tasks where oxidizing methane emissions is required before release into the atmosphere.

As noted, the useful part of this process for oil well cementing is that the reaction is highly exothermic. A localized reaction, for example according to Equation 1, can in some embodiments increase localized temperature by about 200° F. or by about 300° F., and thereby increase cement setting time. Other compounds can also be used in addition to or alternative to noble metals, and certain examples are discussed herein only for illustration purposes.

There are many other oxidation methods that can be used to reach the same goal, such as for example the oxidation of n-alkanes by cobaltic acetate activated by strong acids. This method allows n-alkanes to be significantly oxidized at low temperature in an exothermic reaction and does not depend on traditional addition of accelerators to reduce slurry transition time.

Embodiments of the compositions and methods described are unique, as the use of specifically tailored reagents or compounds, such as for example one or more homogeneous or heterogeneous catalyst and hydrogen peroxide, at specific concentrations allow responsiveness to a predetermined concentration of hydrocarbon gas, for example methane, leaking into the slurry. In the absence of a predetermined threshold of hydrocarbon gas, cement slurries of the present disclosure with gas-responsive compositions will behave as any other standard design cement slurry.

For example, *A review of the direct oxidation of methane to methanol* by Han, B., et al. discusses the state of certain technology surrounding the direct oxidation of methane to methanol. (Chinese Journal of Catalysis 37 (2016) 1206-1215). Both homogeneous and heterogeneous catalysts are discussed, along with strong acid systems. The direct oxidation of methane to methanol is exothermic, but other reactions can occur in embodiments of the present disclosure which are also exothermic. Water is discussed as a viable medium for such reactions with $H_2O_2$ as an oxidant, the oxidant being decomposed for example in the presence of metals/metal ions for the catalytic oxidation of methane. Cement slurries of the present disclosure include aqueous cement slurries.

In *Oxidation of Methane to Methanol with Hydrogen Peroxide Using Supported Gold-Palladium Alloy Nanoparticles*, Hasbi Ab Rahim, M., et al. show Au—Pd supported nanoparticles are suitable for the oxidation of methane to methanol, which can be done using hydrogen peroxide generated in situ from hydrogen and oxygen. (Angew. Chem. Int. Ed. 2013, 52, 1280-1284). CuFe-ZSM-5 (Zeolite Socony Mobil-5) can also be used as a catalyst for the conversion of methane to methanol using $H_2O_2$. In some reactions, the oxidation of methane to methanol is carried out in a liquid phase using water as a solvent and $H_2O_2$ as an oxidant. The conversion of methane to methanol can be carried out between about 30° C. and about 90° C. (about 86° F. to about 194° F.), and thus is suitable for use in hydrocarbon reservoirs and wellbores. Particle sizes of heterogeneous catalyst can be in the range of about 1 nanometer (nm) to about 200 nm, in some embodiments. Suitable temperatures for the reaction to be carried out include temperatures up to about 200° F. in some embodiments, and up to about 300° F. in other embodiments.

In some embodiments of Equation 1, the catalyst includes supported gold-palladium with tin [Pd—Au/$TiO_2$/Sn], where Sn or other catalytic nanoparticles facilitate the oxidation of methane, producing methyl hydroperoxide ($CH_4O_2$) and methanol, using hydrogen peroxide as the oxidant. Methanol selectivity is achieved by performing the reaction in the presence of hydrogen peroxide. In oil well applications, the hydrogen peroxide can be added to the slurry in powdered form as sodium percarbonate ($Na_2H_3CO_6$).

In *Selective Low Temperature Oxidation of Methane with Hydrogen Peroxide by Quasi-Heterogeneous Catalysis*, McVicker, R. discusses methane oxidation to methanol at low temperatures (<250° C.) is effective over high valent transition metal electrophiles. (Cardiff Catalysis Institute 2014). For example, a highly acidic homogeneous catalysis system comprising oleum achieved oxidation of methane to methanol using aqueous chloroplatinum complexes. Other low temperature heterogeneous systems are discussed, for example including platinum.

In *Reaction Mechanism of Oxidation of Methane with Hydrogen Peroxide Catalyzed by 11-Molybdo-1-vanadophosphoric Acid Catalyst Precursor*, Seki, Y., et al. discuss vanadium-containing catalysts for the liquid-phase oxidation of methane with hydrogen peroxide. (J. Phys. Chem. B 2000, 104, 5940-5944). As noted previously, low-temperature oxidation of n-alkanes can also be achieved by cobaltic acetate activated by strong acids. For example, Hanotier, J., et al. in *Low-temperature oxidation of n-alkanes by cobaltic acetate activated by strong acids* discuss strong organic or inorganic acids enhancing the oxidizing activity of cobaltic acetate in acetic acid for n-alkanes. (Journal of the Chemical Society, Perkin Transactions 2 1972).

In embodiments of the present disclosure, homogeneous catalysts comprising metals can be used in addition to or alternative to heterogeneous catalysts comprising metals for the oxidation of hydrocarbon gases, for example methane to methanol. In embodiments of the present disclosure, hydrogen peroxide in addition to or alternative to other oxidants can be added to cement slurry or generated in situ in the wellbore proximate a hydrocarbon bearing formation. Other radical species can be generated as needed for the oxidation of hydrocarbons.

Referring now to FIG. 1, a cross-sectional diagram is shown of a wellbore with a responsive cement slurry of the present disclosure disposed around a casing before setting. In wellbore system 100, a casing 102 in a first annulus is surrounded by a fluid cement slurry 104, for example aqueous cement slurry, in a second annulus surrounding production tubing 106. A hydrocarbon gas-responsive composition 108 is disposed within and suspended amongst fluid cement slurry 104.

In some embodiments, a hydrocarbon gas-responsive composition is mixed with a cement slurry at the surface. In other embodiments, a hydrocarbon gas-responsive composition is mixed with the cement slurry during injection of the cement slurry and/or once the cement slurry is disposed in an annulus and is static. In other embodiments, a hydrocarbon gas-responsive composition can be placed into an annulus before placement of a cement slurry, for example via injection of a spacer fluid comprising a hydrocarbon gas-responsive composition between use of an oil-based and/or water-based mud and the use of a cement slurry in an annulus.

Hydrocarbon gas-responsive composition 108 can comprise, for example, metal catalyst, either or both heterogeneous or homogeneous, hydrogen peroxide in addition to or alternative to other oxidants, and optionally other reagents to effect the oxidation of n-alkanes, such as methane. Components of hydrocarbon gas-responsive composition 108 may be encapsulated for protection from the cement slurry or for delayed release over time into the cement slurry. Hydrocarbon gas seepage points 110 allow hydrocarbon gases to seep into fluid cement slurry 104 from a shallow gas zone, a gas reservoir, and/or a gas cap zone, for example, in hydrocarbon-bearing formation 112. Natural gas, for example comprising methane, may seep into a slurry from other portions of a hydrocarbon-bearing reservoir.

Figure 2:
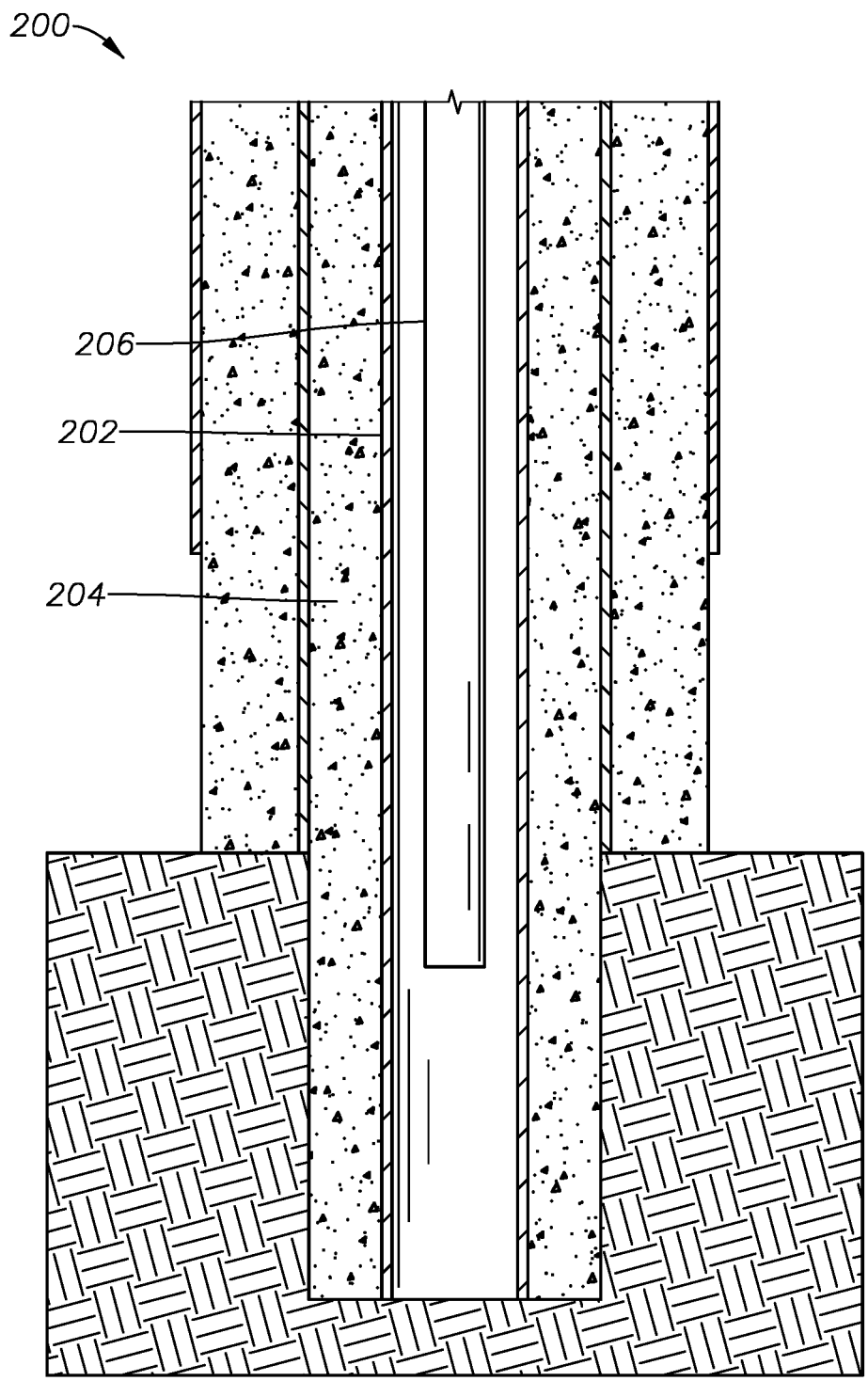
FIG. 2 is a cross-sectional diagram of a wellbore showing a responsive cement slurry of the present disclosure disposed around a casing once set, optionally having been exposed to a gas penetrant from the formation as it set.

Referring now to FIG. 2, a cross-sectional diagram is shown of a wellbore with a set responsive cement slurry of the present disclosure disposed around a casing, optionally having been exposed to a gas penetrant from the formation as it set. In wellbore system 200, a casing 202 in a first annulus is surrounded by a set cement slurry 204 in a second annulus surrounding production tubing 206. In one example, set cement slurry 204 sets faster with hydrocarbon gas-responsive composition 108 from FIG. 1 when a hydrocarbon gas level, for example methane, within fluid cement slurry 104 reaches a predetermined level to trigger an oxidation reaction with hydrocarbon gas-responsive composition 108. This results in an exothermic reaction, for example the oxidation of methane to methanol, causing fluid cement slurry 104 to set to set cement slurry 204. Set cement slurry 204 supports casing 202 while also preventing the seepage of more hydrocarbon gas into set cement slurry 204.

The present systems, methods, and compositions are applicable to drilling and workover operations in all areas with drilling and cementing across formations with expected shallow gas zones, gas cap reservoirs, or gas reservoirs that would channel through the annulus before cement slurry sets. Embodiments provide for reduction and prevention of gas migrating into the wellbore. The quality of the set cement is enhanced for the total life of the well, as gas channels are reduced or eliminated. Unique additives to cement slurry will only activate if predetermined conditions of gas influx are met in static slurry conditions after a planned volume of cement slurry has been pumped into a wellbore annulus. Compositions of the present disclosure can remain inert, or not oxidize or cause any exothermic reaction if the concentration of gas is below the predetermined level.

Oxidation reactions of the present disclosure can proceed at a variety of temperatures. The compositions, once reacted with methane for example, will not affect the strength of the final set cement. Embodiments of the present disclosure eliminate or reduce the occurrence of CCA leaks, which is a common occurrence in cementing operations where a gas influx occurs. The operations typically take 1 to 2 weeks of rig time to remediate. This downtime may now be reduced or eliminated.

Embodiments of the disclosure can also improve zonal isolation of gas bearing zones which will increase reservoir productivity. Underground communication can be eliminated or reduced. Well cementing is critical in the construction, completion, and abandonment of wells. The cement performs vital functions in supporting the casing and wellhead equipment. The casing cannot perform the functions it is designed for unless it is effectively cemented in place. The cement also forms an impermeable barrier to the passage of gases and fluids and enables formations to be isolated once set.

Another advantage of the present application is well integrity. Embodiments of the hydrocarbon gas-responsive compositions allow proper isolation and bonding between pipe cement and formations, thereby extending the life of the well before any intervention is required for repair. Reduction and elimination of gas channeling also increases safety for surface personnel during drilling and workover operations, as there is less risk of gas release at the surface. Surface equipment exposure to gas is also reduced or eliminated.

The singular forms "a," "an," and "the" include plural referents, unless the context clearly dictates otherwise.

In the drawings and specification, there have been disclosed embodiments of compositions, systems, and methods for reducing gas seepage into setting wellbore cement slurries, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for reducing gas seepage into a cement slurry, the method comprising the steps of:

adding a formulation to the cement slurry, the formulation comprising at least one component responsive to a predetermined concentration of free hydrocarbon gas in the cement slurry, the hydrocarbon gas comprising methane with the methane at greater than about 5% by weight of the cement slurry, where upon the cement slurry reaching the predetermined concentration of hydrocarbon gas, the hydrocarbon gas undergoes at least a partial oxidation caused by the formulation to quicken the setting time of the cement slurry via release of heat by an exothermic reaction between the methane and the at least one component responsive to the predetermined concentration of free hydrocarbon gas in the cement slurry;

allowing hydrocarbon gas influx to the cement slurry with the cement slurry in a static condition; and effecting gas channel mitigation once the cement slurry is in place and setting proximate a wellbore in the static condition by accelerating the cement slurry transition profile from slurry to solid and preventing additional gas penetrating a solid cement matrix once the cement slurry sets, wherein in the absence of the predetermined concentration of free hydrocarbon gas in the cement slurry, no exothermic reaction occurs.

2. The method according to claim 1, where the formulation includes an oxidant and a catalyst.

3. The method according to claim 2, where the oxidant comprises hydrogen peroxide.

4. The method according to claim 3, where the catalyst is selected from the group consisting of: a metal-containing heterogeneous catalyst; a metal-containing homogeneous catalyst; and combinations thereof.

5. The method according to claim 4, where the formulation further comprises an acid.

6. The method according to claim 1, further comprising the step of injecting the cement slurry into an annulus proximate the wellbore.

7. The method according to claim 6, further comprising the step of adding the formulation to the annulus via a spacer fluid before injecting the cement slurry.

8. The method according to claim 6, where the step of adding the formulation is performed after the step of injecting the cement slurry.

9. The method according to claim 6, where the step of adding the formulation is performed during the step of injecting the cement slurry.

10. The method according to claim 6, further comprising the step of generating hydrogen peroxide in situ proximate the wellbore.

11. The method according to claim 1, where the formulation comprises between about 1% by weight and about 6% by weight of the cement slurry.

* * * * *